United States Patent
Pandey et al.

(10) Patent No.: US 10,063,782 B2
(45) Date of Patent: Aug. 28, 2018

(54) METHOD AND APPARATUS FOR DISPLAYING AN IMAGE FROM A CAMERA

(71) Applicant: MOTOROLA SOLUTIONS, INC, Schaumburg, IL (US)

(72) Inventors: Aparna Pandey, Chicago, IL (US); Harish Bhandiwad, Schaumburg, IL (US); Randy L Ekl, Lake Zurich, IL (US)

(73) Assignee: MOTOROLA SOLUTIONS, INC., Chicago, IL (US)

( * ) Notice: Subject to any disclaimer, the term of this patent is extended or adjusted under 35 U.S.C. 154(b) by 1193 days.

(21) Appl. No.: 13/920,198

(22) Filed: Jun. 18, 2013

(65) Prior Publication Data
US 2014/0368663 A1  Dec. 18, 2014

(51) Int. Cl.
*H04N 7/18* (2006.01)
*H04N 9/47* (2006.01)
*H04N 5/232* (2006.01)

(52) U.S. Cl.
CPC ..... *H04N 5/23296* (2013.01); *H04N 5/23293* (2013.01); *H04N 7/181* (2013.01)

(58) Field of Classification Search
None
See application file for complete search history.

(56) References Cited

U.S. PATENT DOCUMENTS

| | | | |
|---|---|---|---|
| 7,777,783 B1 | 8/2010 | Chin | |
| 8,325,986 B2 | 12/2012 | Schofield | |
| 8,401,869 B2 | 3/2013 | Renzi | |
| 8,451,312 B2 | 5/2013 | Lee | |
| 8,452,165 B2 | 5/2013 | McCrossan | |
| 2002/0003571 A1* | 1/2002 | Schofield | B60C 23/00 348/148 |
| 2003/0030911 A1 | 2/2003 | Brooks | |
| 2003/0144034 A1 | 7/2003 | Hack | |
| 2004/0020099 A1 | 2/2004 | Osborn | |
| 2004/0230358 A1 | 11/2004 | Stam | |
| 2009/0195652 A1* | 8/2009 | Gal | B60R 1/00 348/148 |
| 2009/0228204 A1* | 9/2009 | Zavoli | G01C 21/30 701/532 |
| 2010/0134264 A1* | 6/2010 | Nagamine | B60Q 9/005 340/435 |

(Continued)

FOREIGN PATENT DOCUMENTS

| | | |
|---|---|---|
| AU | 2007261457 A2 | 3/2009 |
| EP | 2328131 B1 | 10/2012 |
| WO | 2005094351 A3 | 6/2006 |

OTHER PUBLICATIONS

Office Action dated May 18, 2015 for Related U.S. Appl. No.13/920,210.

(Continued)

*Primary Examiner* — Talha M Nawaz (57) ABSTRACT

A method and apparatus for displaying video is provided herein. During operation, video is displayed on one of many displays in a geographically correct fashion. For example, in an embodiment involving two displays (e.g., on a firefighter's two wrists), each of which display a video feed, the video is displayed such that the video feed of the most appropriate scene (not necessarily the video feed of the closest camera) is shown on that display.

20 Claims, 10 Drawing Sheets

(56) References Cited

U.S. PATENT DOCUMENTS

| | | | |
|---|---|---|---|
| 2010/0196859 A1 | 8/2010 | Saugen | |
| 2010/0265048 A1* | 10/2010 | Lu | B60Q 9/005 340/435 |
| 2010/0293580 A1 | 11/2010 | Latchman | |
| 2011/0025851 A1* | 2/2011 | Rumble | G01J 5/02 348/148 |
| 2011/0157366 A1 | 6/2011 | Padmanabh | |
| 2011/0291918 A1* | 12/2011 | Surber | F41H 5/0407 345/8 |
| 2012/0169882 A1 | 7/2012 | Millar | |
| 2012/0221552 A1 | 8/2012 | Reponen et al. | |
| 2012/0249586 A1 | 10/2012 | Wither et al. | |
| 2012/0320190 A1* | 12/2012 | Natroshvili | G06T 5/006 348/135 |
| 2013/0097649 A1 | 4/2013 | Son et al. | |
| 2013/0129122 A1 | 5/2013 | Johnson | |
| 2013/0222590 A1* | 8/2013 | O'Brien | G05D 1/0038 348/148 |
| 2014/0152836 A1 | 6/2014 | Morris et al. | |
| 2014/0184799 A1* | 7/2014 | Kussel | G01B 11/272 348/148 |
| 2014/0226009 A1* | 8/2014 | Lynam | B60K 35/00 348/148 |
| 2014/0368663 A1 | 12/2014 | Pandey et al. | |

OTHER PUBLICATIONS

PCT International Search Report dated Sep. 29, 2014 counterpart to PCT/US2014/041690.

PCT International Search report dated Sep. 29, 2014 for related application PCT/US2014/041696.

EP Communication Pursuant to Article 94(3), Application No. 14736201.6-1905, filed Jun. 10, 2014, Motorola Solutions, Inc., dated May 17, 2017, all pages.

* cited by examiner

FIG. 1

USER FACING SOUTH

METHOD AND APPARATUS FOR DISPLAYING AN IMAGE FROM A CAMERA

CROSS REFERENCE TO RELATED APPLICATIONS

The present application is related to U.S. application Ser. No. 13/920,210, entitled Method and Apparatus for Displaying an Image from a Camera, filed on the same date.

FIELD OF THE INVENTION

The present invention generally relates to displaying an image received from a camera, and more particularly to a method and apparatus for choosing an appropriate image to be displayed on an appropriate display.

BACKGROUND OF THE INVENTION

The use of video by public-safety officers can greatly improve the officer's ability to accomplish a particular task. For example, surveillance video is commonly utilized by public-safety officers to determine whether or not a crime is occurring. The use of video, however, is not highly utilized by first responders. The non-use is mainly because the video is often perceived by the first responder as a distraction.

As is evident, any improvement in the use and display of video that enhances the user experience may increase the chances that video will aide first responders. Thus, there exists a need for a method and apparatus for displaying real-time video to the first responders in a manner that is not distracting, yet provides the needed level of detail.

BRIEF DESCRIPTION OF THE DRAWINGS

The accompanying figures where like reference numerals refer to identical or functionally similar elements throughout the separate views, and which together with the detailed description below are incorporated in and form part of the specification, serve to further illustrate various embodiments and to explain various principles and advantages all in accordance with the present invention.

Skilled artisans will appreciate that elements in the figures are illustrated for simplicity and clarity and have not necessarily been drawn to scale. For example, the dimensions and/or relative positioning of some of the elements in the figures may be exaggerated relative to other elements to help to improve understanding of various embodiments of the present invention. Also, common but well-understood elements that are useful or necessary in a commercially feasible embodiment are often not depicted in order to facilitate a less obstructed view of these various embodiments of the present invention. It will further be appreciated that certain actions and/or steps may be described or depicted in a particular order of occurrence while those skilled in the art will understand that such specificity with respect to sequence is not actually required.

DETAILED DESCRIPTION

In order to address the above-mentioned need, a method and apparatus for displaying video is provided herein. During operation, live video is displayed on one of many displays in a geographically correct fashion. For example, in an embodiment involving two displays (e.g., on a firefighter's two wrists), each of which display a real-time video feed, the video is displayed such that the video feed of the most appropriate scene (not necessarily the video feed of the closest camera) is shown on that display. In particular, the cardinal coordinates for scenes captured by video cameras will be matched to the cardinal coordinates for each display device. Thus, if a first responder is facing north, the right display will show the east view & if facing south, the left display will show the east view.

Having the two geographically accurate displays allows the first responders to glance at the appropriate display (say, in case the responder hears a loud blast from one direction) to assess the situation by easily knowing which display to monitor.

The above-described technique for displaying video mimics a way drivers have used rear-view & side-view mirrors without being distracted by them. In particular, the use of the mirrors are not distracting for a variety of reasons including, the placement of the mirrors, the ability to glance at the mirror only when needed, not having to fiddle with the mirrors when the information is needed & using the mirrors for big picture context awareness rather than detailed information extraction.

Figure 1:
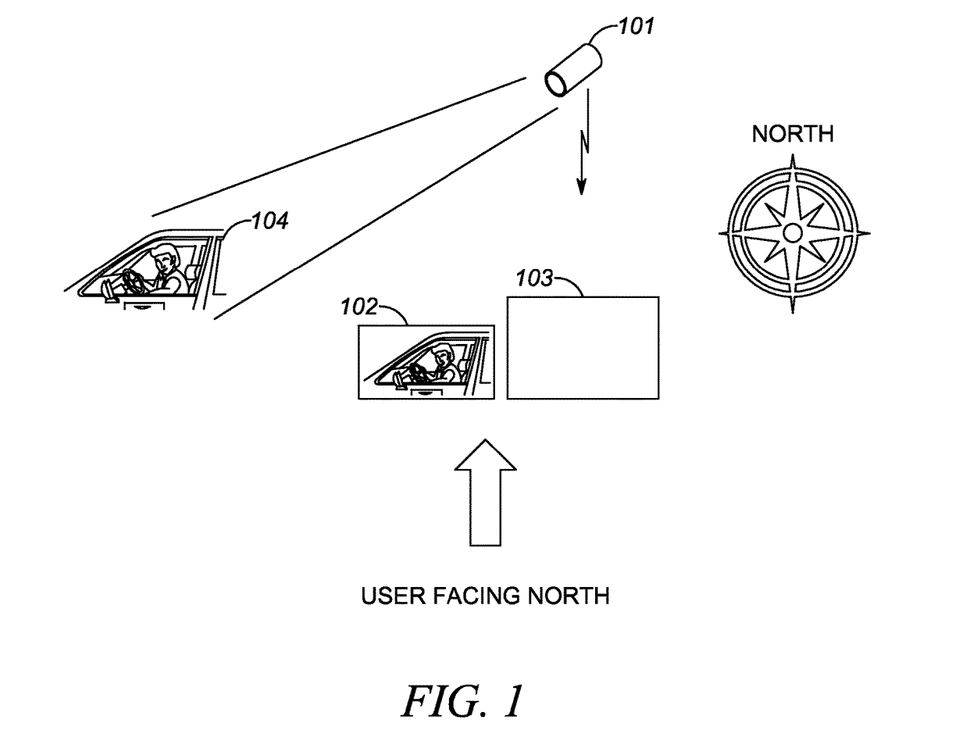
FIG. 1 through FIG. 7 illustrates a general operational environment, according to one embodiment of the present invention.

FIG. 1 illustrates a general operational environment, according to one embodiment of the present invention. As shown in FIG. 1, camera 101 is providing a live video feed of Field Of View (FOV) 104. Camera 101 may be embodied in various physical system elements, including a standalone device, or as functionality in a Network Video Recording device (NVR), a Physical Security Information Management (PSIM) device, a camera bundled within a smartphone device, etc. Furthermore, the camera could be mounted on a mobile entity such as a vehicle (terrestrial, aerial or marine) or a mobile user (such as a camera mounted on a user's helmet or lapel) or a mobile robot. Video display devices 102 and 103 are also shown, oriented such that video display device 102 exists physically closer to FOV 104 than display device 103. Display devices 102 and 103 need not be identical pieces of equipment, and can each be any portable electronic device, including but not limited to a standalone display or monitor, a handheld computer, a tablet computer, a mobile phone, a police radio, a media player, a personal digital assistant (PDA), or the like, including a combination of two or more of these items.

During operation, camera 101 continuously captures a real-time video stream that is available for display on devices 102 and 103. Along with the video steam, camera 101 also captures meta-data that includes the geographic location of camera 101 (e.g., GPS coordinates) and an "absolute direction" (such as N., W., E., S.) associated with each video stream during the course of the operation. This direction refers to the direction of FOV 104 in which camera 101 is recording. Thus, the meta-data may provide information such as the fact that camera 101 is located at a particular location and capturing a particular field of view (FOV). In a simple form, the FOVs simply comprises the video feed or still image or thermal image captured by the camera 101 and further includes, compass directions (e.g., camera pointing at 105 degrees). In a more advanced embodiment, the FOV will comprise location information along with level information and compass direction such that particular FOV may be determined.

The meta-data as described above can be collected from a variety of sensors (not shown) such as location sensors (such as via Global Positioning System), gyroscope, compass, accelerometer associated with the camera. The meta-data may also be indirectly derived from the Pan-Tilt-Zoom functionality of the camera. Furthermore, the aforementioned sensors may either be directly associated with the camera or associated with the mobile entity with which the camera is coupled such as a smartphone, the mobile user, a vehicle or a robot.

The meta-data is transmitted from the camera to the destination devices such as any portable electronic device, including but not limited to a standalone display, a handheld computer, a tablet computer, a mobile phone, a police radio, a media player, a personal digital assistant (PDA), or the like, including a combination of two or more of these items. The transmission of the meta-data could be either via in-band signaling (in the same stream as the video payload) or out-of-band signaling (via a supporting signaling protocol).

As can be readily understood by those skilled in the art, the transmission of video and the supporting meta-data may traverse one or more communication networks such as one or more of wired networks and wireless networks. Furthermore, the video and meta-data may first be transmitted to a video server (not shown) which may post-process the video and meta-data feed and then transmits it to one or more video clients within one or more destination devices. Note that the video server may record and keep a copy of the video and meta-data feed for future use for example to transmit the recorded video and meta-data to an investigator for investigative purposes at a later time. Note that whether the video and the meta-data is served to the end-user in a real-time fashion or at a later time, the concept of the FOV 104 remains the same.

Thus, as described above, the meta-data may comprise a current location of a camera 101 (e.g., 42 deg 04' 03.482343" lat., 88 deg 03' 10.443453" long. 727 feet above sea level), and a compass direction to which the camera is pointing (e,g, 270 deg. from north), and a level direction of the camera (e.g., −25 deg. from level). This information can then be passed to devices 102 and 103 so that the camera's location, direction, and level can be used to determine the camera's FOV.

In alternate embodiments of the present invention the meta-data can include other geographic information about the camera such as a relative position with respect to a known landmark. For example, the meta-data could be 150 feet due east of Landmark Building A, 50 feet above Landmark Building B, pointing towards $75^{th}$ floor of Landmark Building A.

In some embodiments, such as when the camera is coupled with a mobile entity such as a mobile user, a vehicle or a robot, the meta-data is expected to change during the course of the video feed. In other words, as the camera moves, or captures a different field of view, the meta-data will need to be updated accordingly. Thus, at a first time, devices 102 and 103 may be receiving first meta-data from camera 101, and at a second time, devices 102 and 103 may be receiving second (differing) meta-data from camera 101. Devices 102 and 103 may modify the way that any FOV is displayed based on the changed meta-data. In other embodiments, the camera 101 sends the video and meta-data feed to the devices 102 and 103 at a delayed time via a video server (not shown). In other words, at a first time, a video server (not shown) may be receiving first meta-data from the camera 101, and at a second time, the video server may be receiving second (differing) meta-data from camera 101. This video and meta-data feed is recorded by the video server and served to devices 102 and 103 at a later time, i.e., at a first time, devices 102 and 103 may be receiving first meta-data from the video server (not shown), and at a second time, devices 102 and 103 may be receiving second (differing) meta-data from video server (not shown).

Figure 2:
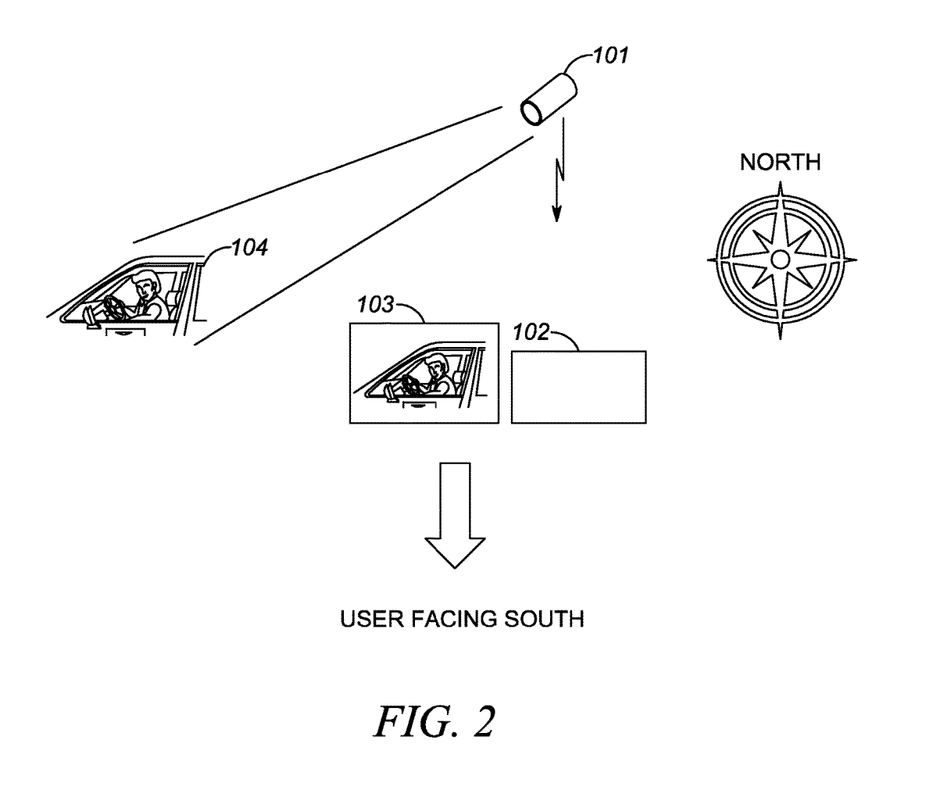

Each display device 102, 103 is associated with context-aware circuitry (compass, gyroscope, accelerometers, GPS and other sensors) that determines its orientation with respect to other display devices and the user. For example, each display device 102 and 103 may be provisioned with data that indicates each device's orientation with respect to other devices 102, 103 and the user. Thus, device 102 may "know" that it exists to the left of device 103 with respect to the user of devices 102 and 103. Based with this knowledge, along with the meta-data from each camera 101, each device 102, 103 determines what video (if any) to display. This is preferably accomplished by each display device calculating "absolute direction" of the display device. Using its known orientation with other display devices, an appropriate video feed is displayed. For example, if a user of devices 102 and 103 is facing north, the left display (display 102) will be associated with west. When the user turns 180 degrees, the left display (display 102) will be associated with east. This is illustrated in FIG. 2. As is evident, in FIG. 2, the user is facing south. Thus, instead of displaying FOV 104 on device 102, FOV 104 is now displayed on device 103. Thus, devices 102 and 103:

knowing their orientation with each other which is either calculated via the context circuitry or in some embodiments could be pre-configured;

knowing their absolute orientation (in this case south); and and knowing the location of FOV 104, via the meta-data associated with the video stream;

are capable of determining whether or not to display an image from a particular camera.

It should be noted that the above example does not simply display the video feed to the "closest" display device. As is evident in FIG. 1 and FIG. 2, camera 101 may be closest to display device 103, in FIG. 1, and device 102, in FIG. 2. However, FOV 104 was shown on the "farthest" display device from camera 101.

Figure 3:
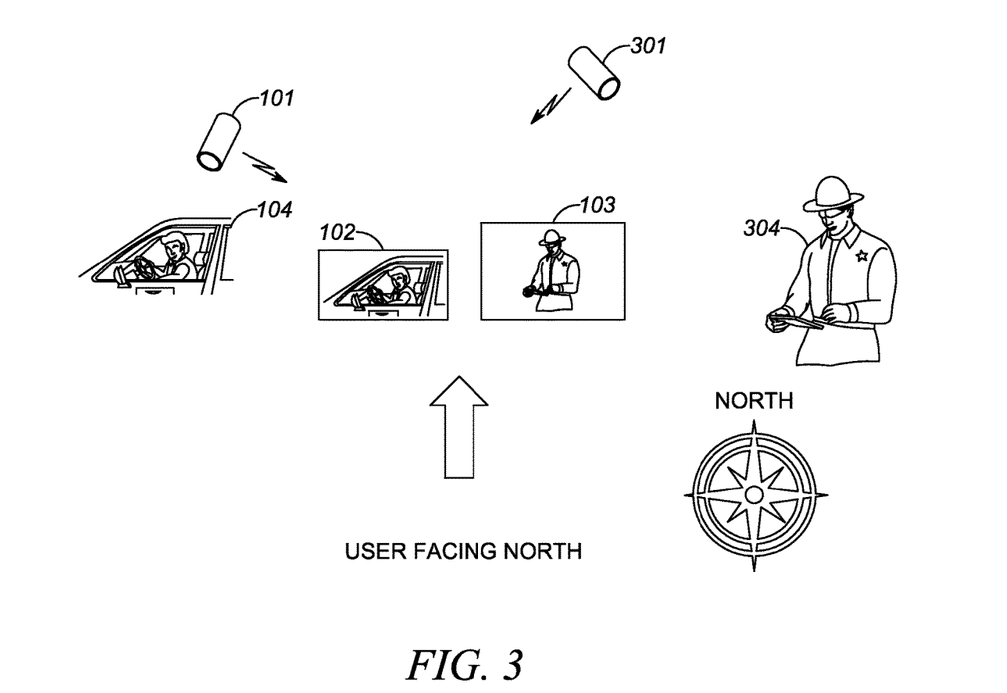

The above functionality can be extended to situations where multiple cameras exist, feeding live video to multiple display devices 102 and 103. This is illustrated in FIG. 3. As shown in FIG. 3, there are now two cameras 101 and 301 each providing a real-time video feed to display devices 102 and 103. In this particular example, camera 101 captures FOV 104 and camera 301 captures FOV 304. The user of devices 102 and 103 will have the east-most FOV 304 displayed on the east-most device 103, while the west-most FOV 104 is displayed on the west-most device 102. Stated more generally, the user of devices 102 and 103 will have the X-most FOV 304 displayed on the X-most device 103, where X is taken from the group consisting of north, south, east, and west.

Figure 4:
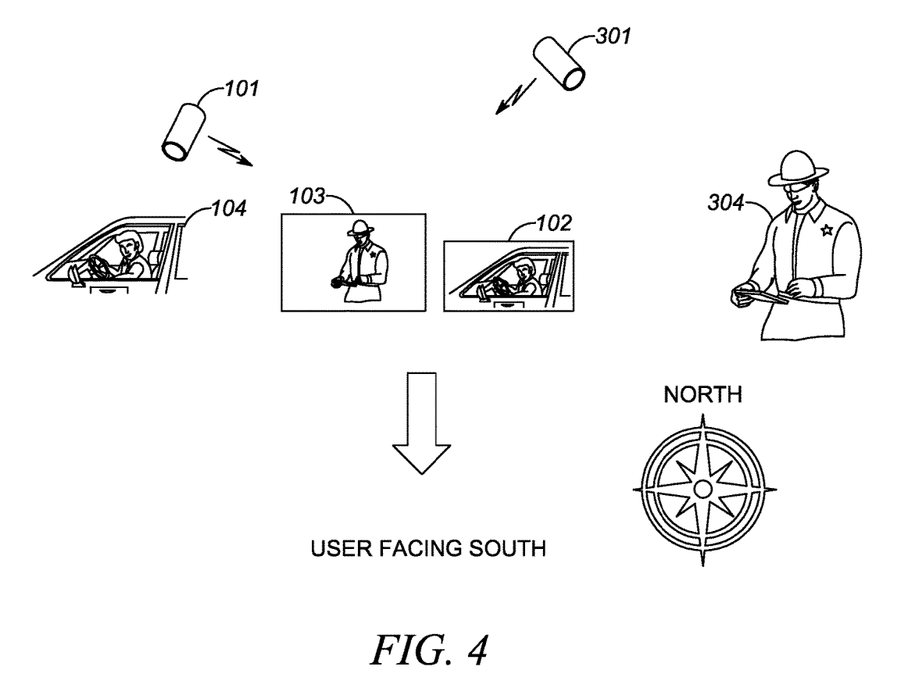

As the user of devices 102 and 103 turns to face south, (FIG. 4), display device 102 now becomes the west-most device and display device 103 becomes the east-most device. As shown in FIG. 4, FOV 104 is now displayed on device 102, while FOV 304 is displayed on device 103. Thus, as the user turns to face a different direction, devices 102 and 103 may update their video feed accordingly.

Figure 5:
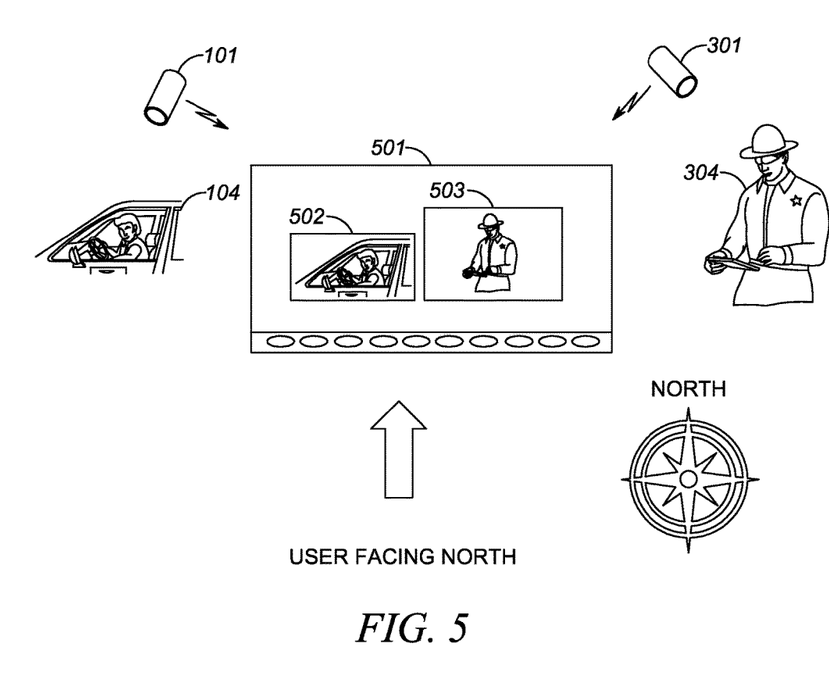

The above functionality may be extended to situations where a single display device shows multiple windows, with each window displaying a video feed from a camera. This scenario is illustrated in FIG. 5. As shown in FIG. 5, a single device 501 (e.g., a handheld computer, a tablet computer, a mobile phone, a police radio, a media player, a personal digital assistant (PDA), or the like) has windows 502 and 503 displayed on the device. Device 501 receives multiple video feeds from cameras 101 and 301. Device 501 determines the cardinal directions of each FOV 104 and 304, and displays the FOV in the appropriate window. For example, when the user of device 501 is facing north, window 502 is the west-most window and will display the west-most video feed from camera 101 (i.e., FOV 104), while window 503 is the east-most window and will display the east-most video feed from camera 301 (i.e., FOV 304). Stated more generally, the user of device 501 will have the X-most FOV 304 displayed on the X-most window 502, 503, where X is taken from the group consisting of north, south, east, and west.

Figure 6:
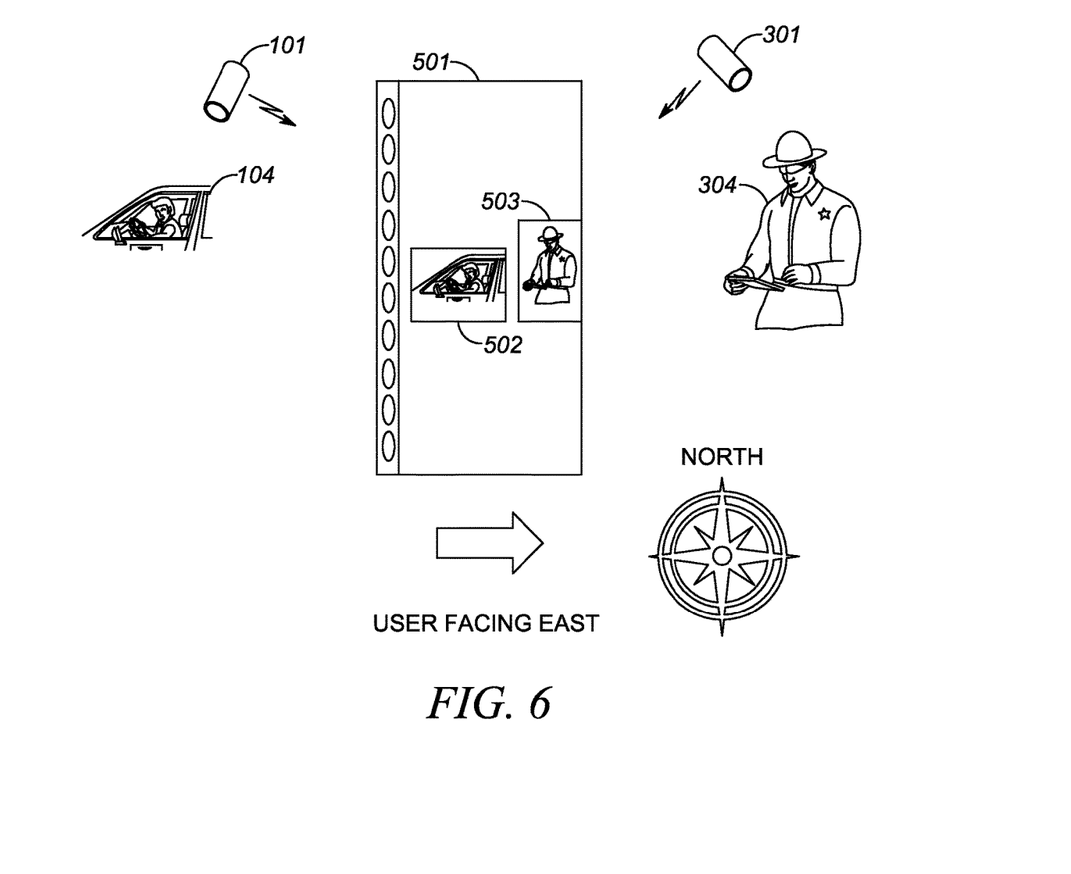

As the user changes the orientation of the device 501 (shown in FIG. 6) windows 502 and 503 will automatically adjust to the new orientation of the device based on the information described above.

Figure 7:
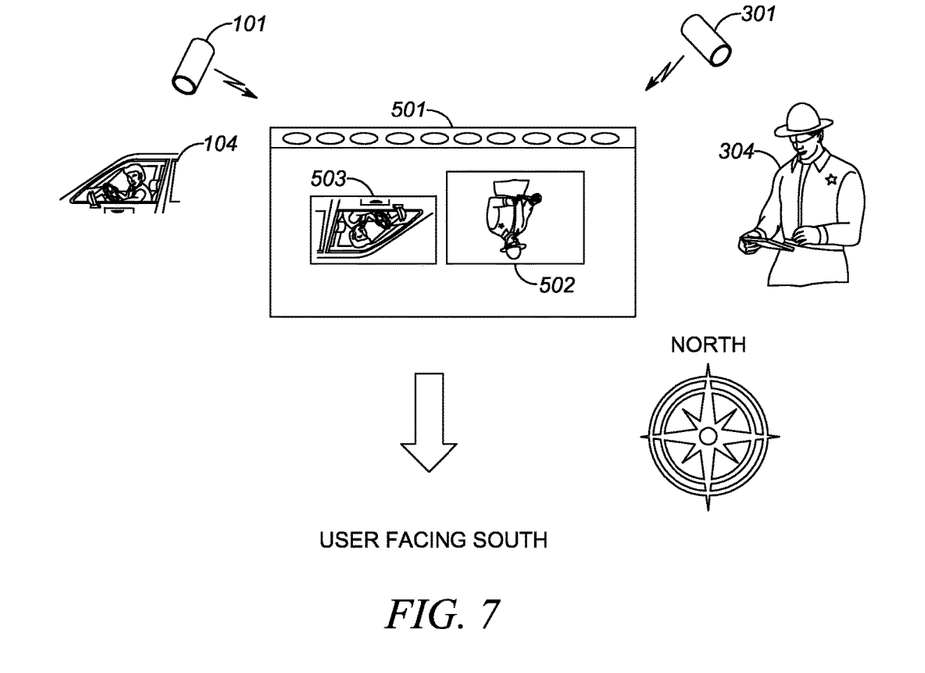

As the user swings around and faces south (shown in FIG. 7) the video that is displayed in windows 502 and 503 will swap, such that window 503 is the west-most window and will display the west-most video feed from camera 101, while window 502 is the east-most window and will display the east-most video feed from camera 301.

Figure 8:
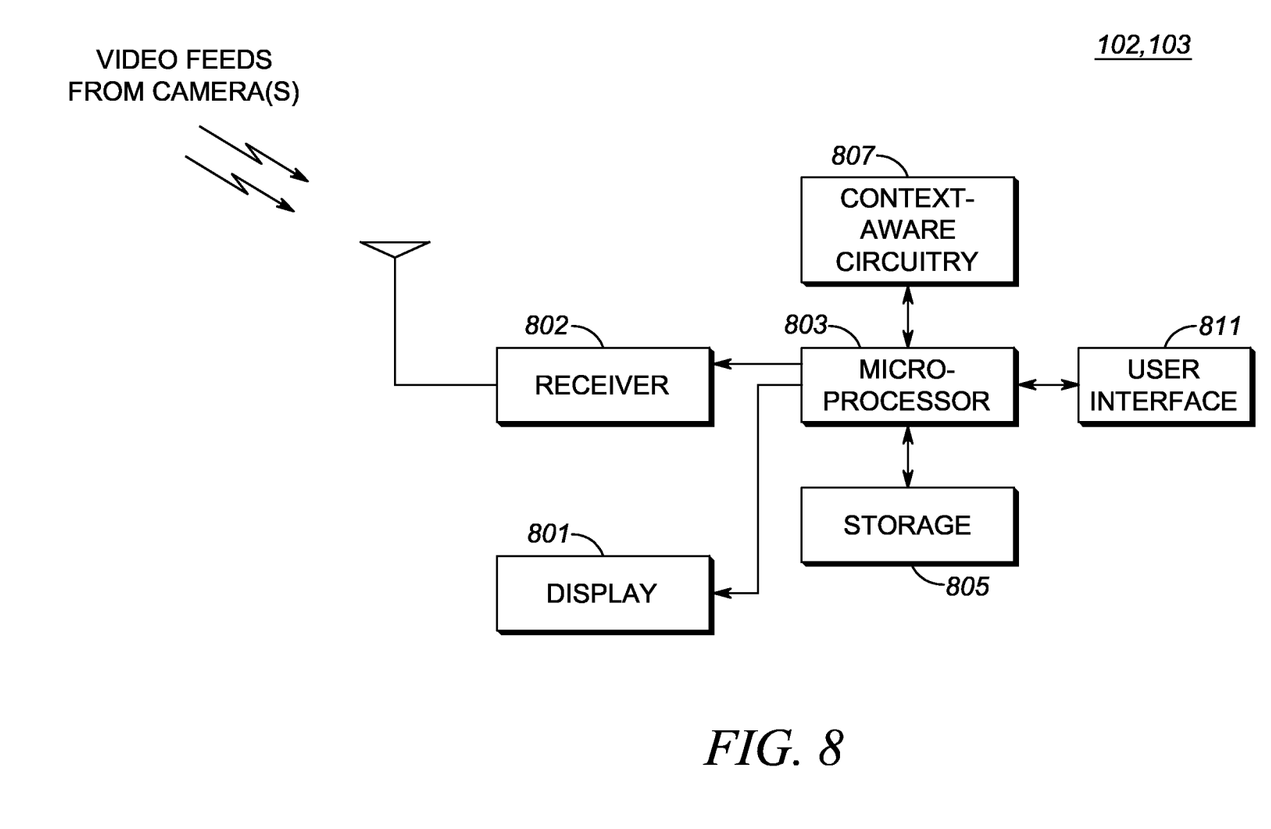
FIG. 8 is a block diagram of a video-display apparatus.

FIG. 8 is a block diagram showing a more-detailed view of devices 102 and 103 of FIG. 1 through FIG. 4. Although the elements of FIG. 8 can exist within a single device 102, 103, in alternate embodiments of the present invention, these elements may exist separately as part of a "user space". The user space can be defined as the user's personal space that includes all the electronic devices, communication devices, sensors and displays that a user would carry. These devices carried by the user typically communicate with each other using wired or wireless communication protocols. For example, a public safety official may carry one or more communications radio with their in-built individual displays and sensors such as a compass, gyroscope, accelerometer, pedometer etc., wearable devices such as helmet cameras, wrist displays, head-mounted displays, body harness or jackets with in-built devices such as a lapel camera, sensors like temperature sensors, microphone, etc. In such a case, the components shown in FIG. 8 are distributed amongst many physical devices within a user space that communicate with each other using wired or wireless communications protocols such as Bluetooth, Near Field Communications, Wireless Local Area Network etc. In alternate embodiments, the user space extends to a user's vehicular space for example when the user is traveling in a vehicle and would additionally have access to the electronic devices, communications devices, displays and sensors in the vehicle via wired or wireless communications protocols such as Bluetooth, Near Field Communications, Wireless Local Area Network etc.

The devices preferably comprise processor 803 that is communicatively coupled with various system components, including display 801, receiver 802, general storage component 805, context-aware circuitry 807, and potentially, a user interface (GUI) 811. Only a limited number of system elements are shown for ease of illustration; but additional such elements may be included in the device.

Processing device 803 may be partially implemented in hardware and, thereby, programmed with software or firmware logic or code for performing functionality described in FIG. 8; and/or the processing device 803 may be completely implemented in hardware, for example, as a state machine or ASIC (application specific integrated circuit). Processing device serves as a FOV display selector. The processing device 803 may include processing the received video stream and its associated meta-data, processing required for a display selector that selects appropriate display for a given video stream based on its meta-data and the context information such as location orientation etc. of displays.

Storage 805 can include short-term and/or long-term storage of various information needed for determining an orientation of the device with respect to other devices. For example, storage 805 may be populated with information on its location with respect to other devices. For example, storage 805 may contain such information as the device is the "leftmost" or "rightmost" device. When more than two devices are being utilized, storage 805 may be populated with information on the orientation of all devices with respect to each other. Storage 805 may further store software or firmware for programming the processing device 803 with the logic or code needed to perform its functionality, including but not limited to the logic or code needed to process the received video stream and its associated meta-data, logic or code needed to perform the display selector function that selects appropriate display for a given video stream based on its meta-data and the context information such as location orientation etc. of displays.

User interface 811 receives an input from the user which may be used to populate storage 805. User interface 811 may include a keypad, a display/monitor, a mouse/pointing means, and/or various other hardware components to provide a man/machine interface. In some embodiments, no user intervention will be needed to activate this invention on the said devices.

In a first embodiment, context-aware circuitry 807 preferably comprises compass, however in alternate embodiments circuitry 807 may comprise any device capable of generating information used to determine an orientation of the device (e.g., facing north). Regardless of the makeup of context-aware circuitry 807, logic circuitry 803 will use information generated by circuitry 807 to determine form the orientation of the device.

Receiver 802 comprises common circuitry known in the art for communication utilizing a well known communication protocol, and serve as means for receiving the meta-data and video feed from cameras. For example, receiver 302 may be well known long-range transceivers that utilize the Apco 25 (Project 25) communication system protocol. Other possible receivers include receivers using the IEEE 802.11 communication system protocol, receivers utilizing Bluetooth, receivers utilizing HyperLAN protocols, or receivers utilizing any other communication system protocol including but not limited to a land mobile radio system (LMRS), a public land mobile radio, a private land mobile radio system, a first responders network authority (FirstNet) nationwide network (FNN), an enhanced data rates for Global System for Mobile Communication (GSM) Evolution (EDGE) Radio Access Network (GERAN), a Universal Terrestrial Radio Access Network (UTRAN) and/or an Evolved Universal Terrestrial Radio Access (E-UTRAN) as defined by the long term evolution (LTE), LTE-advance (LTE-A) and subsequently defined in subsequent releases, such as LTE-beyond (LTE-B), Near Field Communications, mesh networking etc.

Display device 801 may comprise any device utilized to display a video feed. Preferably, device 801 comprises LCD (liquid crystal display) technology, or LPD (light emitting polymer display) technology, although other display technologies may be used in other embodiments.

Figure 9:
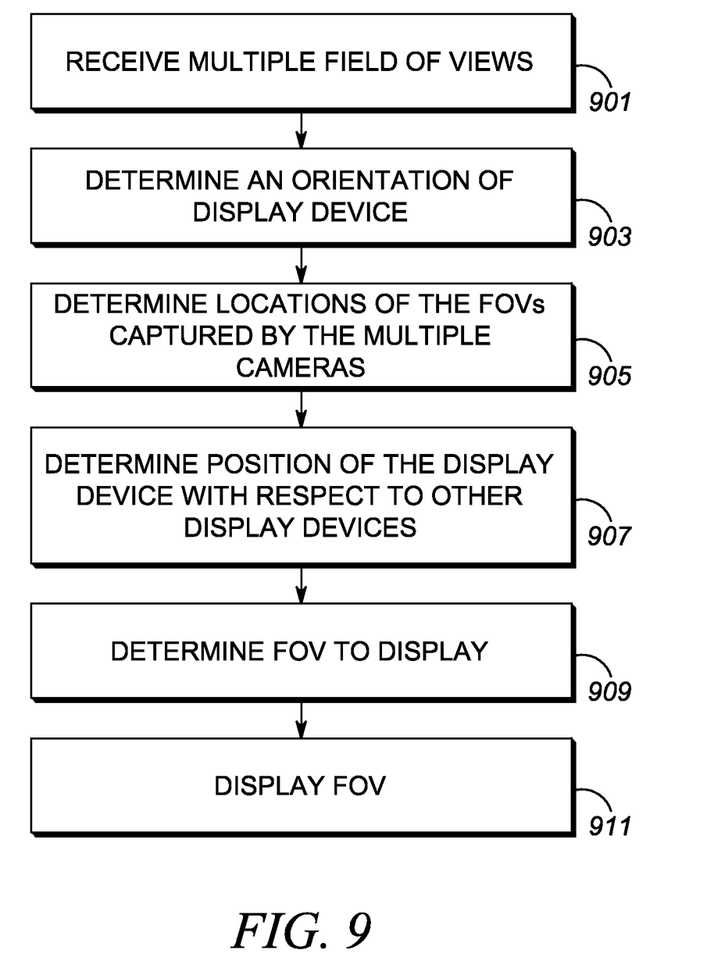
FIG. 9 is a flow chart showing operation of the apparatus of FIG. 8 in accordance with a first embodiment of the present invention.

FIG. 9 is a flow chart showing operation of the apparatus of FIG. 8 in accordance with a first embodiment of the present invention. More particularly, the flow chart of FIG. 9 illustrates steps (not all necessary) taken by the device of FIG. 8 when determining what image to display on display device 801, when only a single image will be displayed on each display 801. In FIG. 9 receiver 802 receives multiple field of views (FOVs) from multiple cameras (step 901) and context-aware circuitry 807 determines an orientation of the display device (step 903). The orientation preferably comprises a compass heading of the display device.

Logic circuitry 803 then determines locations of the FOVs captured by the multiple cameras (step 905) and the position of the display device with respect to other display devices (step 907). As discussed above, the location of the FOV can comprise such things as a location of the camera, a compass direction to which the camera is pointing, or geographic information about the camera, or a relative position with respect to a known landmark. Additionally, the position of the display device with respect to other display devices may comprise a position such as to the right, to the left, above, or below the other display device Finally, at step 909 logic circuitry 803 determines what FOV to display based on the location of the FOV, the orientation of the display device, and the position of the display device with respect to the other display devices. The FOV is then displayed (step 911).

As discussed above, the multiple FOVs can be received as video or still images (including thermal images). Additionally, the location of the FOVs captured by the multiple cameras can be received as meta-data from the multiple cameras. The display device shown in FIG. 8 can utilize a monitor displaying an FOV on the display device when the FOV is located X of the display device and the display device is X-most display device, wherein X=north, south, east, or west. 2.

Figure 10:
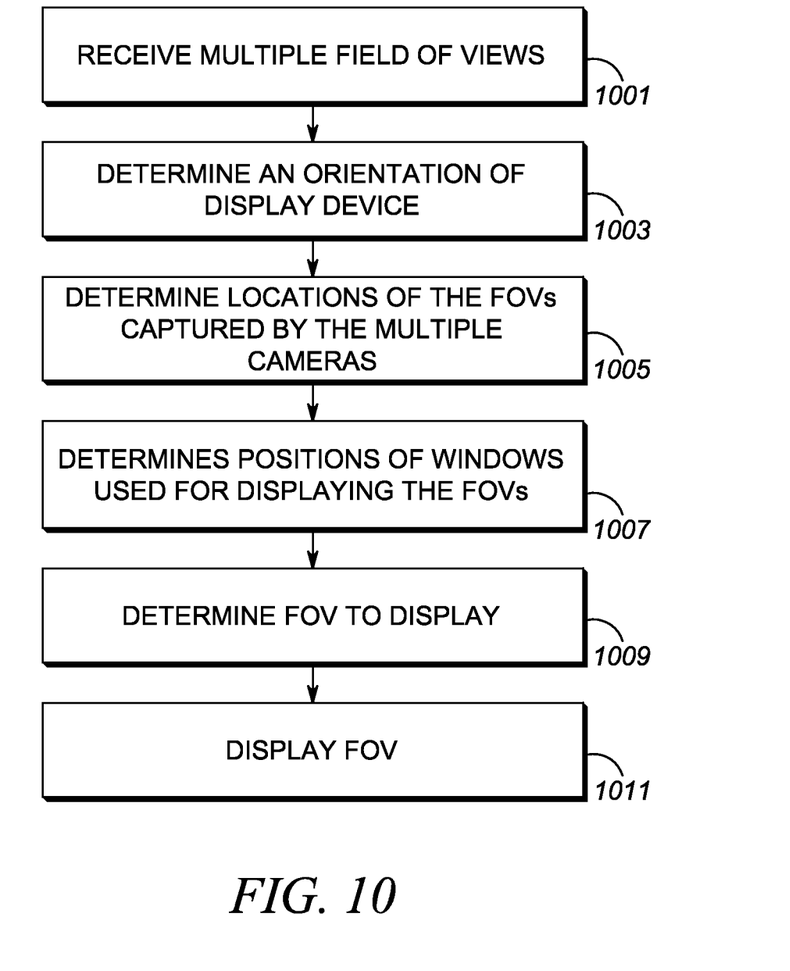
FIG. 10 is a flow chart showing operation of the apparatus of FIG. 8 in accordance with a second embodiment of the present invention.

FIG. 10 is a flow chart showing operation of the apparatus of FIG. 8 in accordance with a second embodiment of the present invention. In particular, the steps shown in FIG. 10 (not all necessary) describe the operation of the device of FIG. 8 when displaying an image within a window on display 801 when display 801 is preferably displaying multiple windows simultaneously.

The logic flow begins at step 1001 where receiver 802 receives multiple field of views (FOVs) from multiple cameras. At step 1003 context-aware circuitry 807 determines an orientation of the apparatus shown in FIG. 8. As discussed, the orientation preferably comprises a compass heading of the display device. Logic circuitry 803 then determines directions or locations of the FOVs captured by the multiple cameras (step 1005). As discussed, the location of the FOVs captured by the multiple cameras is determined by receiving meta-data from the multiple cameras indicating the location of the FOV. These locations of the FOVs comprise a location of the camera, a compass direction to which the camera is pointing, or geographic information about the camera, or a relative position with respect to a known landmark.

Logic circuitry 803 then determines positions of windows used for displaying the FOVs (step 1007). At step 1009 logic circuitry 803 determines what FOV to display in each window based on the location of the FOVs, the orientation of the display device, and the position of the windows used for displaying the FOVs.

As discussed above, the positions of windows used for displaying the FOVs comprises if a particular window is to the right, left, above, or below at least one other window. Additionally, the multiple FOVs preferably comprise video or still images (including thermal images).

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings.

Those skilled in the art will further recognize that references to specific implementation embodiments such as "circuitry" may equally be accomplished via either on general purpose computing apparatus (e.g., CPU) or specialized processing apparatus (e.g., DSP) executing software instructions stored in non-transitory computer-readable memory. It will also be understood that the terms and expressions used herein have the ordinary technical meaning as is accorded to such terms and expressions by persons skilled in the technical field as set forth above except where different specific meanings have otherwise been set forth herein.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:

1. A method for a display device to display a field of view (FOV) captured by a camera, the method comprising the steps of:
    receiving by the display device the FOV from a camera;
    determining by the display device a location of the FOV captured by the camera;
    determining by the display device an orientation of the display device;
    determining by the display device the position of the display device with respect to other display devices; and
    determining by the display device whether or not to display the FOV received from the camera based on the location of the FOV, the orientation of the display device, and the position of the display device with respect to the other display devices.

2. The method of claim 1 wherein the step of receiving the FOV comprises the step of receiving the FOV as a video or a still image or a thermal image.

3. The method of claim 1 wherein the step of determining the location of the FOV captured by the camera comprises the step of receiving meta-data from the camera indicating the location of the FOV.

4. The method of claim 1 wherein the step of determining an orientation of the display device comprises the step of determining a compass heading of the display device.

5. The method of claim 1 wherein the step of determining the position of the display device with respect to other display devices comprises the step of determining if the display device lies to the right, to the left, above, or below the other display device.

6. The method of claim 1 further comprising the step of:
    displaying the FOV on the display device when the FOV is located X of the display device and the display device is X-most display device, wherein X=north, south, east, or west, otherwise not displaying the FOV.

7. The method of claim 1 wherein the step of determining the location of the FOV comprises the step of determining location of the camera, a compass direction to which the camera is pointing, or geographic information about the camera, or a relative position with respect to a known landmark.

8. A method for a display device to display a FOV, the method comprising the steps of:
    receiving by the display device multiple field of views (FOVs) from multiple cameras;
    determining by the display device locations of the FOVs captured by the multiple cameras;
    determining by the display device an orientation of the display device;
    determining by the display device the position of the display device with respect to other display devices; and
    determining by the display device what FOV to display based on the location of the FOV, the orientation of the display device, and the position of the display device with respect to the other display devices.

9. The method of claim 8 wherein the step of receiving the multiple FOVs comprises the step of receiving the multiple FOVs as video or images.

10. The method of claim 8 wherein the step of determining the location of the FOVs captured by the multiple cameras comprises the step of receiving meta-data from the multiple cameras indicating the location of the FOV.

11. The method of claim 8 wherein the step of determining an orientation of the display device comprises the step of determining a compass heading of the display device.

12. The method of claim 8 wherein the step of determining the position of the display device with respect to other display devices comprises the step of determining if the display device lies to the right, to the left, above, or below the other display device.

13. The method of claim 8 further comprising the step of:
    displaying an FOV on the display device when the FOV is located X of the display device and the display device is X-most display device, wherein X=north, south, east, or west.

14. The method of claim 8 wherein the step of determining the locations of the FOVs comprises the step of, for each FOV, determining location of the camera, a compass direction to which the camera is pointing, or geographic information about the camera, or a relative position with respect to a known landmark.

15. An apparatus comprising:
a receiver receiving multiple field of views (FOVs) from multiple cameras;
context-aware circuitry determining an orientation of a display device; and
logic circuitry determining locations of the FOVs captured by the multiple cameras, determining the position of the display device with respect to other display devices, and determining what FOV to display based on the location of the FOV, the orientation of the display device, and the position of the display device with respect to the other display devices.

16. The apparatus of claim 15 wherein the multiple FOVs are received as video or images.

17. The apparatus of claim 15 the location of the FOVs captured by the multiple cameras are received as meta-data from the multiple cameras.

18. The apparatus of claim 15 wherein the orientation comprises a compass heading of the display device.

19. The apparatus of claim 15 the position of the display device with respect to other display devices comprises to the right, to the left, above, or below the other display device.

20. The apparatus of claim 15 further comprising:
a monitor displaying an FOV on the display device when the FOV is located X of the display device and the display device is X-most display device, wherein X=north, south, east, or west.

* * * * *